June 10, 1952  H. WEICHSEL  2,599,960

APPARATUS FOR TESTING DYNAMOELECTRIC ARMATURES

Filed March 21, 1946  7 Sheets-Sheet 1

INVENTOR:
HANS WEICHSEL
BY
ATTORNEY

June 10, 1952 — H. WEICHSEL — 2,599,960
APPARATUS FOR TESTING DYNAMOELECTRIC ARMATURES
Filed March 21, 1946 — 7 Sheets-Sheet 2
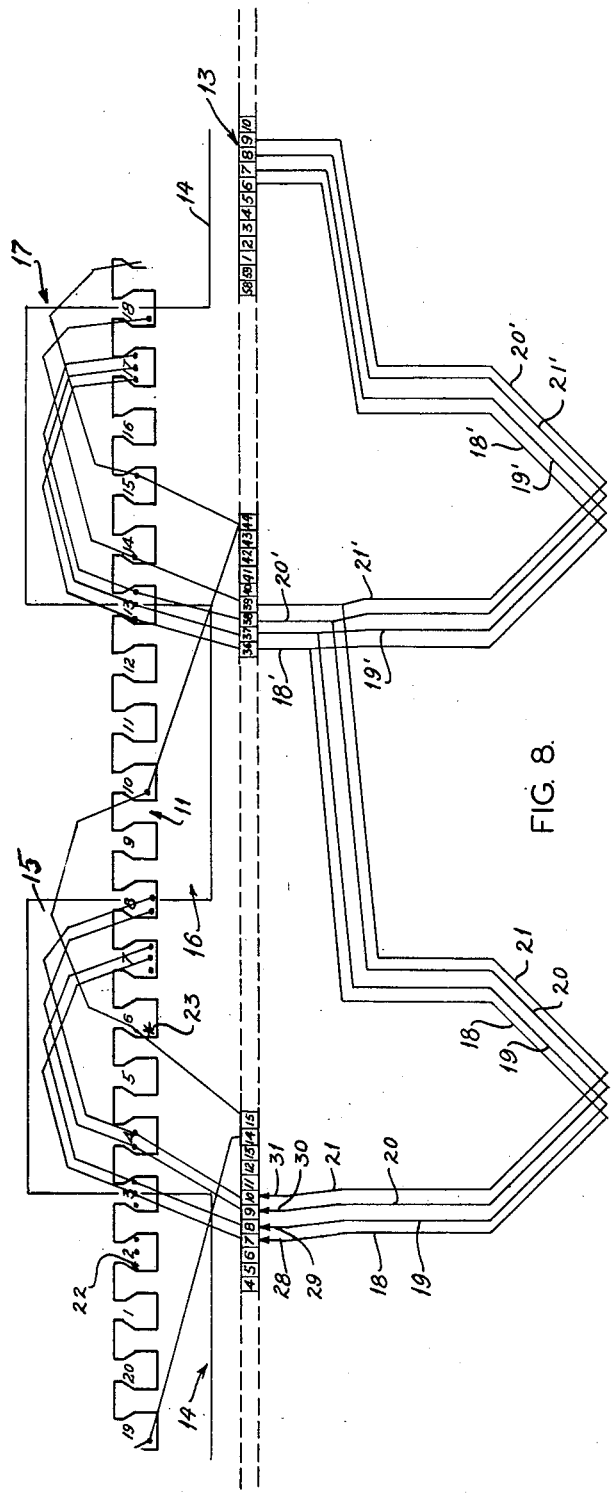
FIG. 8.
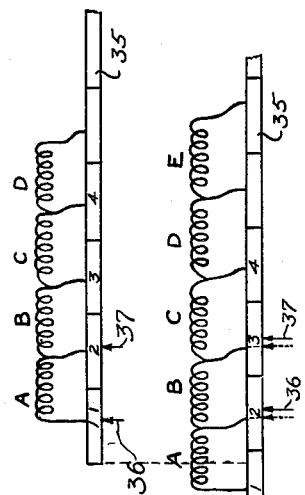
FIG. 11.
FIG. 12.
INVENTOR:
HANS WEICHSEL
BY *[signature]*
ATTORNEY.

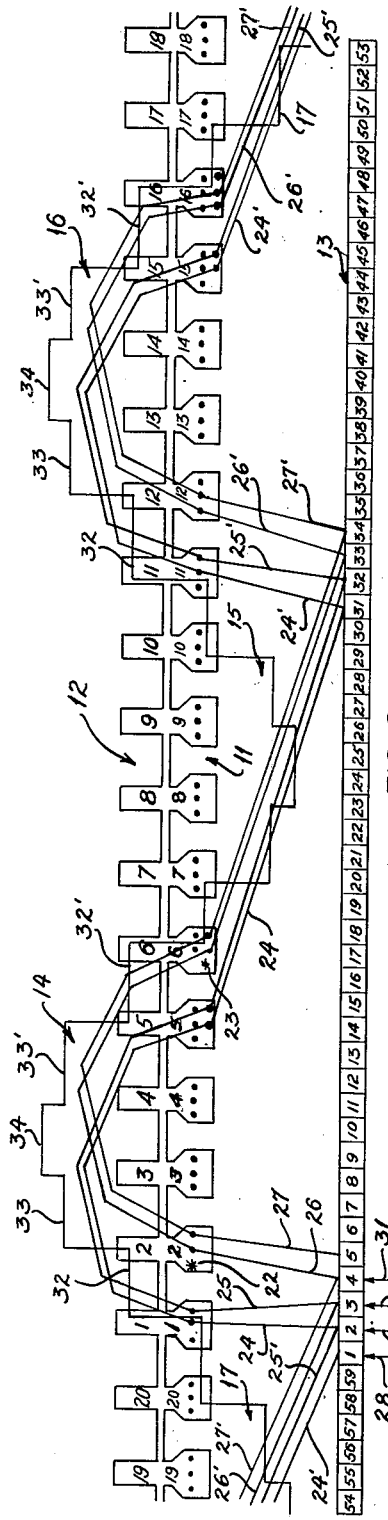

June 10, 1952     H. WEICHSEL     2,599,960
APPARATUS FOR TESTING DYNAMOELECTRIC ARMATURES
Filed March 21, 1946     7 Sheets-Sheet 4
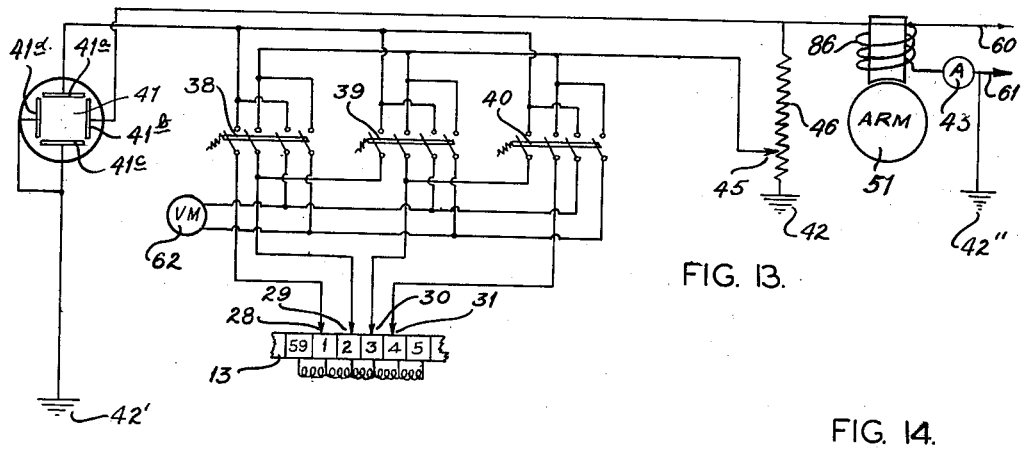
FIG. 13.
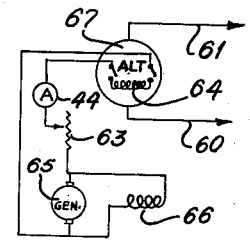
FIG. 14.
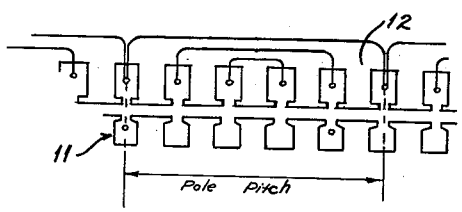
FIG. 15.
| FAULT IN ROTOR WINDING | % MAIN WNDG. AMP. METER 43 | % VOLTS BETWEEN BRUSHES METER 62 | IMAGE ON SCOPE |
|---|---|---|---|
| None – Good Armature | 100 | 100 | — |
| One Coil Having More Turns Than Specified | 100 | 115 | |
| One Coil Having Less Turns Than Specified | 100 | 85 | |
| One Turn Shorted In one coil | 140 | 55 | |
| Short Between Segments | 165 | 0 | |
FIG. 16.
INVENTOR:
HANS WEICHSEL
BY
ATTORNEY.

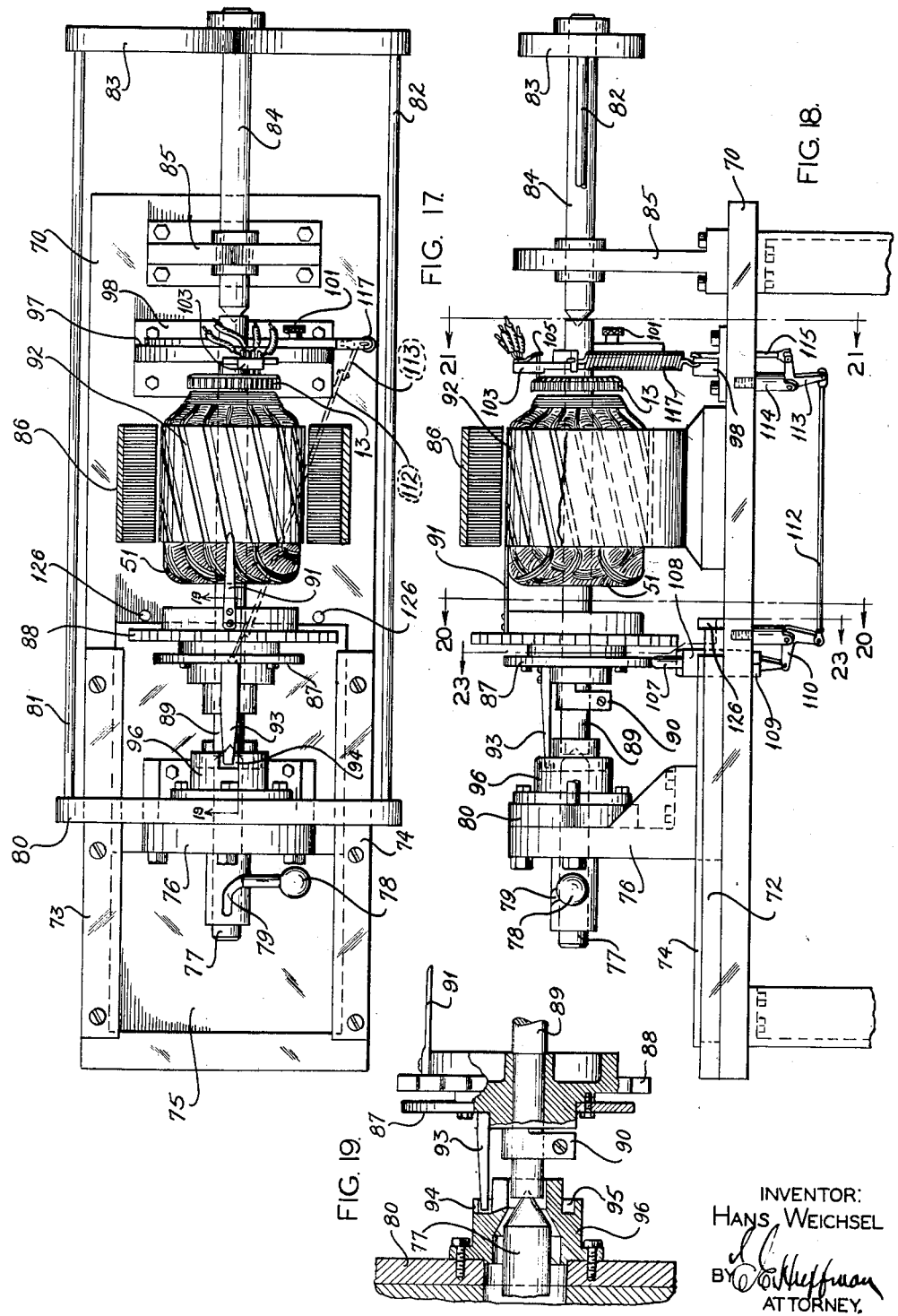

June 10, 1952     H. WEICHSEL     2,599,960
APPARATUS FOR TESTING DYNAMOELECTRIC ARMATURES
Filed March 21, 1946     7 Sheets-Sheet 6
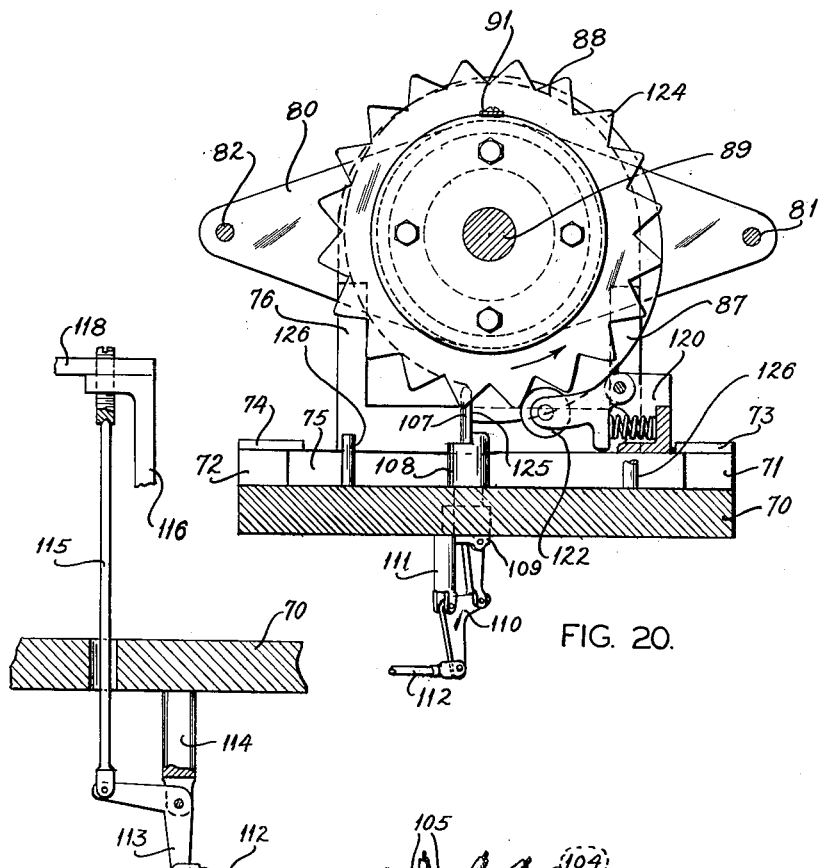
FIG. 20.
FIG. 22.
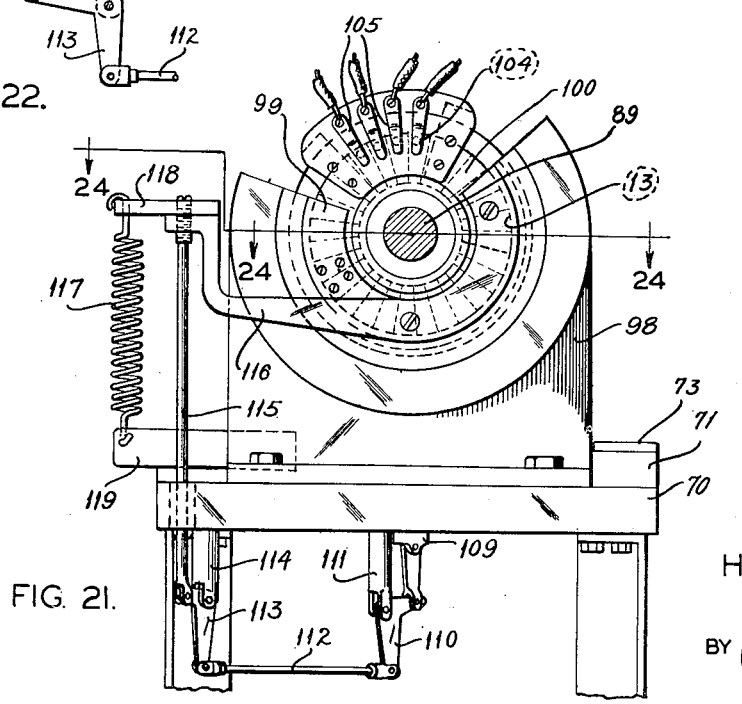
FIG. 21.
INVENTOR:
HANS WEICHSEL
BY
ATTORNEY.

June 10, 1952      H. WEICHSEL      2,599,960
APPARATUS FOR TESTING DYNAMOELECTRIC ARMATURES
Filed March 21, 1946      7 Sheets-Sheet 7
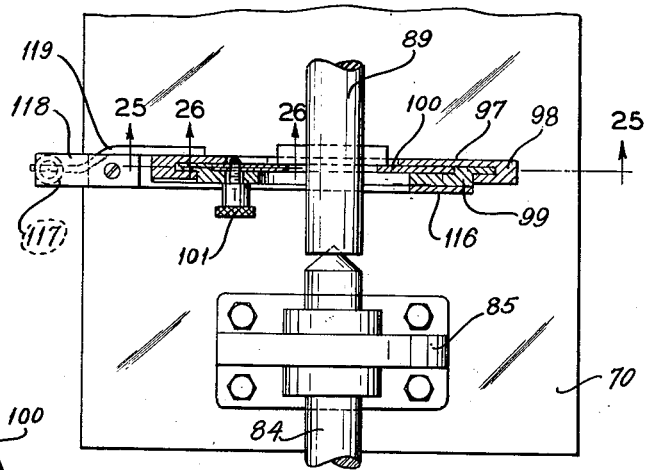
FIG. 24.
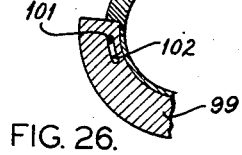
FIG. 26.
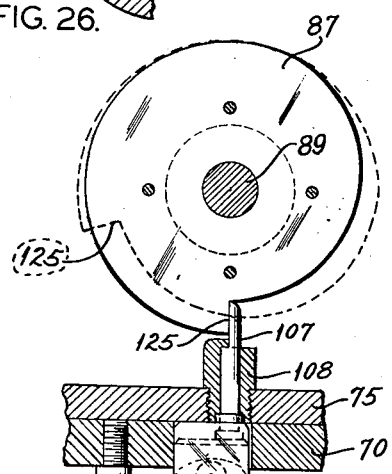
FIG. 25.
FIG. 23.
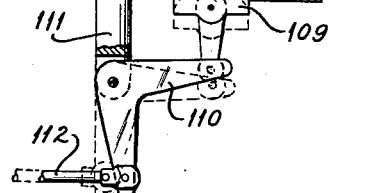
FIG. 27.
INVENTOR:
HANS WEICHSEL
BY    *[signature]*
ATTORNEY.

Patented June 10, 1952

2,599,960

UNITED STATES PATENT OFFICE 2,599,960

APPARATUS FOR TESTING DYNAMO-ELECTRIC ARMATURES

Hans Weichsel, Webster Groves, Mo., assignor to Wagner Electric Corporation, St. Louis, Mo., a corporation of Delaware Application March 21, 1946, Serial No. 655,966

19 Claims. (Cl. 175—183)

This invention pertains to a method and means for testing certain types of dynamo electric machine armatures having a commuted winding.

In accordance with one standard commercial design of motors provided with a commuted armature winding, what is known as a two-circuit or "wave" winding is employed and the number of commutator segments is not a multiple of the number of armature slots. In an armature which has one fewer commutator segments than armature coils it results that under usual machine winding practice of applying the same number of coils to each rotor slot, one armature coil will not be connected with a commutator segment. This coil is commonly referred to as a "dead" coil and the rotor slots in which it is located have one fewer active coils than the others and a lack of uniformity exists in displacement between coils forming a circuit between corresponding sides of two adjacent segments.

This invention relates to a method and apparatus for testing armatures of the kind just described to ascertain whether they are free from faults resulting from manufacturing errors. Faults may be one or more of the following: (a) shorts between coils, between turns of an individual coil, or between commutator segments; (b) incorrect number of turns in a coil; (c) grounds between coils and core or between commutator segments and core; (d) open circuits due to broken conductors or lack of connection with the commutator; (e) erroneous selection of a commutator segment for connection to a particular coil; and (f) improper application of one or more coils to the core whereby the coil span is greater or less than specified.

In an armature having the same number of commutator segments as coils and free from faults, the application of a constant alternating current magnetic field to the armature would result in the difference of potential between each pair of commutator segments being uniform when said pair of segments is in a specific rotative position with relation to the field. Therefore, in an armature of this type the existence of a fault would be indicated if the difference of potential between a particular pair of segments varied from the normal, but in an armature provided with a two-circuit winding and with one fewer commutator segments than armature coils, an irregularity is introduced which, if not compensated for, would result in voltage variations in some test positions even though the armature were free from faults, and thus a tester would not know whether a variation from normal of the voltage appearing between two particular commutator segments when in test position was due to a fault or due to a difference in coil relations to field resulting from the presence of the dead coil.

I have ascertained that if a test stator for association with a two-circuit winding armature for testing the latter is wound to produce a stator pole having a predetermined span in relation to the coil throw of the rotor coils and an initial test position of the rotor is selected under which the brushes are in contact with specific segments when the rotor has a selected rotative position with respect to the field, uniform voltage will appear between each pair of commutator segments when in test position if the armature is free from faults and notwithstanding the fact that the number of commutator segments is one fewer than the number of armature coils and there is, therefore, a dead coil.

The accompanying drawings illustrate the coil and commutator segment relations in a 4-pole armature provided with a two-circuit winding and having one fewer commutator segments than coils, and also one suitable apparatus for testing armatures of this type.

Figures 1 to 7, inclusive, are explanatory diagrams illustrating various space relations between armature coils and field poles.

Figures 8 and 9 are developed views of an armature provided with a two-circuit winding comprising sixty coils, twenty armature slots, and fifty-nine commutator segments. By these diagrams the position of each coil with respect to a field pole in each of the rotative armature positions and the space position of the dead coil can be determined.

Figure 10 is a tabulation showing the flux embraced by each coil when it is brought to the test position in which its circuit is closed through the test brushes.

Figures 11 and 12 are diagrams indicating the conditions which require brush shifting during an armature test.

Figure 13 illustrates the test circuits connected with the test brushes and which include an indicating device such as an oscilloscope.

Figure 14 is a circuit diagram of a high frequency alternator for supplying current to the stator in the test apparatus.

Figure 1:
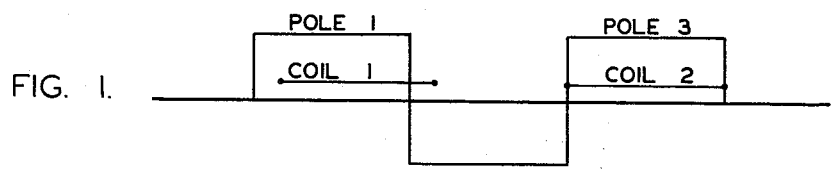

Figure 15 diagrammatically illustrates the winding of one pole of the test stator and one armature coil when in a proper test position.

Figure 16 illustrates different forms of images appearing on the screen of an oscilloscope in the test circuit under the armature conditions indicated in said figure.

Figures 17 to 27, inclusive, illustrate a suitable apparatus for testing armatures provided with a two-circuit winding and one fewer commutator segments than armature coils, Figure 17 being a plan view showing an armature to be tested positioned therein, and Figure 18 a side elevational view of the apparatus indicated in Figure 17.

Figure 19 is a sectional view along the line 19—19 of Figure 17.

Figure 20 is a sectional view along the line 20—20 of Figure 18.

Figure 21 is a sectional view along the line 21—21 of Figure 18.

Figure 22 more clearly illustrates the form and relation of the bellcrank lever and associated parts shown at the lower left-hand corner of Figure 21.

Figure 23 is a view along the line 23—23 of Figure 18 and illustrating parts of the brush shifting mechanism.

Figure 24 is a sectional view of the test brush holder taken substantially along the line 24—24 of Figure 21.

Figure 25 shows the test brush holder in elevation, and supporting parts for the holder in section substantially along the line 25—25 of Figure 24.

Figure 26 is a sectional view along the line 26—26 of Figure 24.

Figure 27 is a sectional view on the line 27—27 of Figure 25 and illustrating one of the test brushes.

Figures 8 and 9 illustrate the rotor winding locations and connections to a commutator 13 in an armature provided with a two-circuit winding and having sixty coils (fifty-nine active and one dead coil), twenty rotor slots, and fifty-nine commutator segments, and in Figure 9 the development of a test stator having twenty winding slots is shown. The shape of the magnetic field indicated in this figure is that produced by a stator pole provided with a stator winding of the kind illustrated in Figure 15. Under the assumption above made as to the number of armature coils, each armature slot contains six coil sides. The coil sides located in the top of the slots are indicated in Figure 9 but the coil sides located in the bottom of the slots have been omitted except as to those forming part of the particular armature coils illustrated in this figure.

Arrows 28, 29, 30, and 31 in Figure 9 represent commutator brushes contacting with commutator segments numbered 1, 2, 3, and 4, respectively, this being a proper initial test position under the winding and field relations which exist and are illustrated in this figure. Coil circuit 24 connected to commutator segment 2 passes through armature slot 1, armature slot 5 and to commutator segment 31. The other coil in circuit therewith and indicated as coil 24' extends from commutator segment 31, through rotor slot 11, rotor slot 15, and to commutator segment 1. Coils 25 and 25' form a connection from commutator segment 3 to commutator segment 2; coils 26 and 26' from commutator segment 4 to commutator segment 3; and coils 27 and 27' from commutator segment 5 to commutator segment 4. In the apparatus illustrated in Figure 9 the armature coil throw is four rotor teeth and the pole arc span equals five rotor teeth.

It will be noted that coils 26 and 27 pass through slots containing the sides of the dead coil, which sides are indicated as 22 and 23. The location and connections of the remainder of the coils of the armature will be apparent and for clarity these have been omitted. However, if the winding were completed, it would be found (and this is illustrated in Figure 8 by the coil connected across commutator segments 15 and 44 and that connected across commutator segments 9 and 38) that in several brush positions the coil side forming the beginning of a coil circuit is displaced nine rotor tooth pitches from the beginning of the second coil with which it is connected in series whereas in the other coil circuits shown the above mentioned displacement is ten rotor tooth pitches. The latter is the condition of the coils illustrated in Figure 9 whereas the former is the condition which exists as to the coil connected to commutator segment 15 in Figure 8. Since, as previously indicated, successful testing of a two-circuit winding armature depends upon uniformity of voltage appearing at the brushes in each test position, it is essential that conditions be set up whereby each coil, when in test position, will embrace the same number of magnetic lines of force of the alternating stator field as all other coils embrace when in test position and in my testing apparatus this condition can occur notwithstanding the difference in coil side displacement just referred to.

Figure 2:
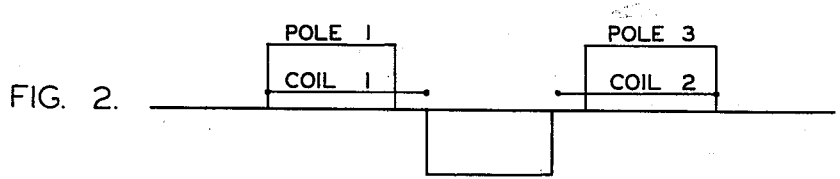
Figure 3:
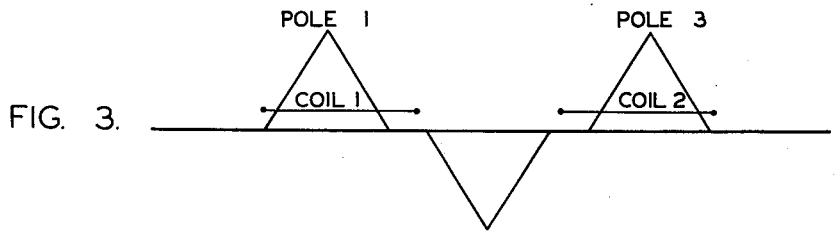
Figure 4:
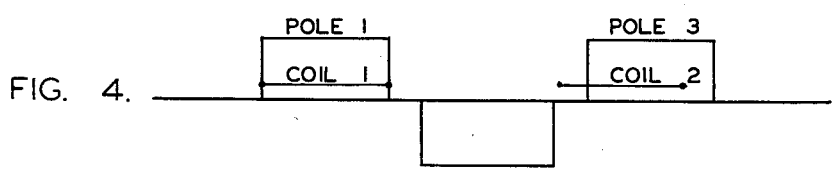
Figure 5:
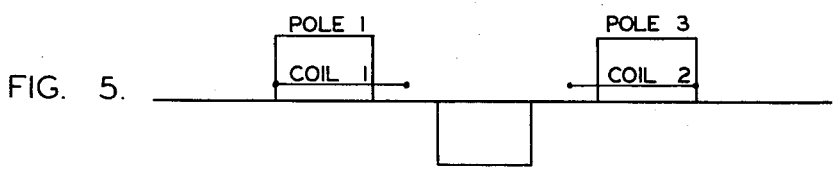
Figure 6:
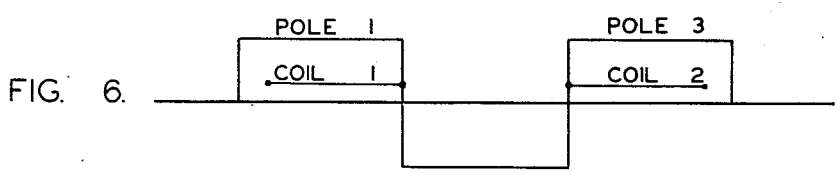
Figure 7:
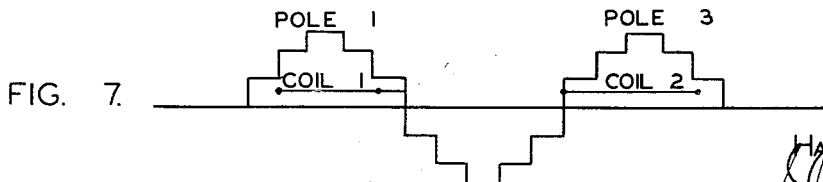

Referring to diagrammatic Figures 1 to 7, which show various space relations of coils to stator magnetic fields, the relations shown in Figures 1 and 4 would result in different induced potentials in the respective coils shown but equal potentials would be induced under the relations shown in Figures 2, 3, 5, 6, and 7 and in this connection it will be noted that the space relations of the coils and magnetic fields in Figures 2, 3, and 5 differ from the space relations illustrated in Figures 6 and 7.

The armature testing apparatus illustrated in Figures 17 to 27 comprises a suitable base 70 on which a slide 75 is movable in a way formed by the side rails 71, 72 secured to the base and with which are associated retaining plates 73 and 74 extending over the upper edges of the slide. Secured to the slide is a journal 76 in which a head stock 77 is reciprocably mounted and movable by a handle-operated member 78 moving in cam track 79. A tail stock member 84 is mounted to be axially slidable in a journal 85 secured to base 70. This tail stock is secured to a cross-member 83 the ends of which are connected by rods 81 and 82 to a cross-member 80 secured to the journal 76 carried by slide 75. A test stator 86 to receive an armature to be tested is secured to base 70.

To the shaft 89 of a rotor to be tested is applied a unitary assembly comprising an indexing wheel 88 (best shown in Figure 20), a brush actuating cam 87, a finger 91 which engages with a rotor slot 92, and a locating finger 93 which, in view of finger 91 extending into a rotor slot, determines the rotative position of the armature with respect to the stator field when the armature is first placed therein. This results from the fact that assembly of the armature in the stator can be achieved only under that rotative position of the armature in which said finger 93 may pass through slot 94 into the circular way 95 in fixture 96 which is secured to cross-member 80, which latter member, as previously stated, is in turn secured to journal 76. Thus the proper initial test position of the armature is determined by selection of the armature slot to be engaged by finger 91 when the subassembly of which it is a part is applied to the armature shaft. Clamp 90, forming part of the indexing wheel structure, secures the latter in non-rotative relation with the armature shaft. The armature is rotatably supported by head stock 77 and tail stock 84. To insert the armature into the test apparatus the slide 75 and tail stock frame connected thereto are moved to the left of the position shown in Figure 17. Stops 126 engaged by the slide determine the relative longitudinal position of the armature and stator during testing.

The test brush assembly is generally designated by the numeral 97 and comprises a bracket 98 secured to base 70. A ring member 99 is rotatably mounted in bracket 98 on an axis concentric with the axis of the armature shaft 89 and a brush holder plate 100 is rotatably mounted in the ring member 99 for rotation about an axis which is also concentric with armature shaft 89. Relative rotative relation between members 99 and 100 may be adjusted by means of clamping screw 101 which is threaded into the brush holder plate 100 and is movable in a slot 102 in ring 99. This adjustment means enables the operator to adjust the position of the brushes should irregularity of spacing between commutator segments in a particular armature be such as to require such adjustment during a test in addition to the automatic adjustment hereinafter described. Brush holder 103, carrying brushes 104, is secured to the brush holder plate 100. Brush followers 105 cooperate with the brushes and are connected to leads 106.

In testing an armature of the kind herein described each test position is one rotor slot pitch in advance of the previous test position and the number of commutator segments not being an integral multiple of the number of rotor slots, automatic means is provided for a slight shifting of brushes during the rotation from one test position to another to maintain the brushes in desired relation to the commutator segments belonging to the coil under test.

In Figure 11 an adjacent pair of brushes 36—37 are shown in the center of the segments 1 and 2 of commutator 35 with which they are in contact, and Figure 12, which shows a succeeding test position, illustrates that the brushes would not be in the center of the succeeding segments 2 and 3 if their position were not changed when moving from one test position to the next, the dotted arrows indicating the position of the brushes before shifting. The mechanism for automatic shifting of the brushes is illustrated in Figures 18, 20, 21, 22 and 23. The brush holder plate 100 is actuated by cam 87 which rotates with the armature, the actuating mechanism comprising a cam follower 107 (see Figure 23) slidably mounted in bushing 108 secured to slide 75. The follower 107 engages with plunger 109 vertically slidable in base 70, which plunger actuates an arm of the bellcrank lever 110 pivoted on pin 111 carried by the base. The other arm of the bellcrank is connected by rod 112 to an arm of a second bellcrank lever 113 pivotally mounted on pin 114 carried by base 70. A vertical rod 115 connects this bellcrank lever with a lever 116 secured to brush holder plate 100. Spring 117, secured to an extension 118 on lever 116 and to a bracket 119 carried by the brush holder bracket, returns the brush holder to its initial position when, after one revolution of the armature, follower 107 again occupies its initial position against shoulder 125 as shown in Figure 23.

The mechanism for indexing the armature one rotor slot pitch comprises a spring-actuated lever 120 carrying a roller 122 engaging with the peripheral notches between teeth 124 in the indexing member 88. The number of these notches equals the number of rotor slots of the armature to be tested, and in a machine having twenty rotor slots and fifty-nine commutator segments the profile of the actuating cam 87 is so formed as to shift the brushes one fifty-ninth of three hundred and sixty mechanical degrees during one armature revolution and therefore one-twentieth of this amount during each rotation from one rotor test position to the succeeding test position.

Figure 13 shows a suitable testing circuit for revealing faults in armature construction and comprises a cathode ray oscilloscope. This instrument is well known to those skilled in the art and is of the general construction described in a publication by John F. Rider, publisher, 1440 Broadway, New York, entitled "The Cathode Ray Tube at Work" published in August 1935.

As indicated in Figure 13, the voltage impressed on the oscilloscope 41 will be the difference between the voltage appearing between a pair of commutator segments and a fixed voltage in opposition thereto which is derived from a potentiometer 46 connected across leads 60 and 61 from a high frequency alternator 67 by means of the ground connections 42 and 42''. The test stator excited by the alternator is diagrammatically indicated at 86 in Figure 13. Numeral 43 indicates an ammeter in the field circuit of the test stator.

Assuming the test position indicated in Figure 13 in which brushes 28 and 29 engage commutator segments 1 and 2, the closing of switch 38 establishes a circuit including commutator segments 1 and 2, potentiometer 46, and oscilloscope 41, the voltage impressed on the oscilloscope being, as previously mentioned, the difference between voltage between commutator segments 1 and 2 and the potentiometer voltage which latter value may be regulated by adjustable contact 45. I preferably adjust this potentiometer voltage to a value equal to, and one hundred and eighty degrees displaced from, the voltage induced in the coils when the circuit is completed between brushes 28 and 29. Under the condition that these coils were properly wound and located, the image on the oscilloscope will be substantially as illustrated at the top of the third column in the diagram of Figure 16, this being the image due to the voltage between plates 41b and 41d of the oscilloscope and which is supplied from the alternator as indicated by the diagram. If conditions are abnormal whereby there is a difference between the potentiometer voltage and the voltage between the commutator segments in a circuit, a voltage will appear between the plates 41a and 41c of the oscilloscope. Under this condition the oscilloscope image may be comparable to one of the other images shown in Figure 16 or constitute some other variation from a straight line.

After a test of the circuit including commutator segments 1 and 2, switch 38 is opened and switch 39 closed to establish a test circuit comprising commutator segments 2 and 3, following which, by means of closing switch 40, a test circuit including segments 3 and 4 is established. I also prefer to employ in each test circuit a voltmeter 62 connected in parallel with the oscilloscope, as indicated in Figure 13, the reading of this voltmeter and the reading of ammeter 43 being useful in interpreting the nature of the fault indicated by the image appearing on the oscilloscope.

As shown by Figure 14, the alternator 67, which furnishes the exciting current of the test stator field, is separately excited by means of generator 65 through adjustable resistance 63. It is preferred that the exciting current for the test stator field be of relatively high frequency, one thousand cycles being suitable.

In an armature having a two-circuit winding and in which the number of commutator segments is not an integral multiple of the number of rotor slots, the corresponding sides of certain of the series connected coils are displaced from each other fewer rotor slot pitches than the displacement between corresponding parts of other coils. It is this condition that is the basis of the problem involved in testing armatures of this kind. As previously stated, unless testing conditions are such that in an armature free from faults equal voltages will appear between each pair of commutator segments when their coils are in test position, a tester would not know whether a noted variation in voltage was caused by a fault. It is, therefore, necessary that the relation of field span to armature coil throw be such that each coil, when brought to test position, will embrace the same number of magnetic lines of the field although some coils will have different space positions with reference to the field from that occupied by other coils when under test. In the particular machine herein illustrated and described the armature coil throw is one rotor pitch less than the stator pole arc and under this condition there are several possible initial test positions which may be selected whereby under rotation of a fault-free armature from such position for successive testing of the coils, equal voltages will appear between the commutator segments contacted by the brushes. However, if test is started from any one of numerous other positions in which one coil is in proper inductive relationship to the field for its test, the displacement characteristics in two-circuit windings will produce the result that in some succeeding test positions the coil under test will not embrace the same amount of magnetic flux as other coils.

One correct initial test position for an armature having the rotor slot, commutator segments and winding relations indicated in Figure 9 is the position shown in that figure and in which brush 31 rests on commutator segment 4 and is connected to the central conductor in a slot containing one side of the dead coil and in which the center of said slot is positioned one rotor slot pitch away from the mid-point between the centers of adjacent stator poles, this displacement being such with reference to the direction of rotation of the armature during test that rotation of the armature to the extent of one rotor slot pitch from the initial position brings the center of the slot containing the dead coil into alignment with said mid-point.

Figure 10 discloses the complete tabulation, for all twenty rotor positions, of the flux embraced by the various coil circuits subjected to test as shown in Figure 9. The coil circuit is identified by the commutator segments to which it is connected. For instance in rotor test position one, with brushes 28 and 29 on segments 1 and 2, the coil circuit is connected to segments 2, 31, and 1 as indicated in the horizontal row headed "Segments." The flux embraced by the first coil in this circuit (coil $n$) is found in the following manner from Figure 9. Coil $n$, starting from segment 2, lies in rotor slots 1 and 5 and, therefore, embraces the flux of the magnetic field 14 indicated by the rectangular areas below the lines 32, 33, 34 and 33'. The area below 34 is taken as having a value of 1, and the area below 32 is 31% or .31 of the value of the area below 34. Similarly the areas below 33 and 33' are 81% or .81 of the value of 34. Coil $n$, therefore, embraces a flux of .31+.81+1+.81. For lack of space these figures are recorded as 31, 81, 1, 81 in the space belonging to the left vertical column under heading "Position 1" and the horizontal row headed "Flux Embraced Coil N."

By a similar process the second coil beginning at segment 31 (coil $n'$) of the circuit under consideration is seen to be located in the rotor slots 11 and 15. This coil embraces a flux proportional to the rectangular areas below 32, 33, 34 and 33' of the field 16. Thus this coil embraces a flux proportional to .31+.81+1+.81 as represented by the figures 31, 81, 1, 81 in the horizontal row headed by "Flux Embraced Coil N."

The total flux embraced by both coils in the test circuit is the sum of the fluxes of the individual coils. It is, therefore, .31+.81+1+.81 (the flux embraced by coil $n$)+.31+.81+1+.81 (the flux embraced by coil $n'$). This totals 5.86 as shown in the horizontal row headed "Total Flux Between Brushes."

The same process is followed for the two other coil circuits located between the segments 3 and 2 and between the segments 4 and 3. The flux values are found in the other vertical columns under position 1.

For rotor testing position 2, the rotor and commutator is moved to the left one rotor slot pitch so that rotor slot 2 coincides with stator slot 1 and the brushes 28, 29, 30 and 31 contact segments 4, 5, 6 and 7, respectively. A new diagram can be made for this position and the fluxes embraced can be read from this figure as they are tabulated in table 10 under position 2. This process can be repeated for all twenty rotor positions resulting in the values shown in Figure 10.

It will be seen that the total flux for all test circuits for the various rotor positions has a constant value of 5.86. This is identical with saying that the voltage across the various circuits is proportional to a constant value of 5.86.

If the coils in the actual machine are perfect and correctly connected and if the rotor is placed in the correct initial position (as shown in Figure 9) in the testing apparatus, the voltages indicated will be constant. If the initial position is not chosen correctly, the results will not be constant because of the presence of the dead coil as described previously.

In my test apparatus the initial relations above defined can be readily established as to each armature to be tested. The stator field and the brushes occupy a predetermined relation when the armature to be tested is inserted and this relation may be made that indicated in Figure 9. And assuming any relative fixed position of locating fingers 93 and 91 (shown in alignment in Figure 17) it is only necessary to insert finger 91 into that armature slot whereby it will be determined that when the rotative position of the armature to be tested is that in which finger 93 will enter slot 94, the slot containing one side of the dead coil will be located in that position with respect to the stator field which is shown in Figure 9.

In lieu of providing the test stator with windings which would produce a field span one rotor slot pitch greater than the armature coil throw, windings may be employed which produce a field span one rotor slot pitch less than the armature coil throw. Under this last mentioned condition a test started with the proper initial relations of field, brushes, and rotative position of the armature will also result in uniform voltages appearing between the commutator segments in various test positions if the armature is free from faults, such voltage merely being of smaller value than when the inducing field spans more than an armature coil throw.

From the foregoing description and explanations it will be understood that in providing suitable test apparatus for armatures having a two-circuit winding and a winding distribution which results in the number of commutator segments being less than an integral multiple of rotor slots, relations between the span of the field produced by a test stator pole and armature coil throw, physical position of test brushes with relation to the stator field and consequently the position of armature coils with relation to that field when the same are in the test circuit, are to be taken into account. If means is provided to rotate the armature to the extent of one rotor slot pitch with relation to the inducing field to establish succeeding test positions, a relation between the factors mentioned can be found which, if made effective under the initial test position, will establish coil and field relations under which uniform test voltages will appear at each successive test position notwithstanding that the disposition of the armature winding coils is such that not all the coils when under test will occupy exactly the same space position with respect to the stationary inducing field. My basic conception, therefore, is to test armatures of the kind here described by providing means for establishing armature test positions each of which is displaced to a like extent from the adjacent position and then providing mechanical means for inserting the armature into the test stator in a particular rotative relation thereto, this rotative relation, the test brush position, and the relation of span of field produced by a test stator pole to armature coil throw being so selected as that, notwithstanding variation in coil side displacements in the armature winding, successive indexing of the rotor to the predetermined extent will result in each coil, when under test, having the same relation as others to the inducing field with respect to the number of magnetic lines of force which they embrace.

In armatures of the type described, a difficulty is found in measuring the magnetic lines of force through the winding under test. Simple rotation of the armatures with respect to the stator field and brushes will not of itself insure that the brushes engage those commutator segments corresponding to the coil circuit under test because of the lack of an integral multiple relationship between the number of armature slots and commutator segments. Means are provided, as described above, in my invention for shifting the brushes during the rotation of the armature from one test position to the succeeding test position to insure that the brushes contact correctly the commutator segments corresponding to the coil circuit under test.

In the immediately preceding discussion it was assumed that the test stator is wound to produce a field of uniform density commonly referred to as a "rectangular field." Figure 9 illustrates that there are relations between coil throw, stator pole arc, and width of stator field under which a symmetrical field may be employed which is not of uniform density.

Having fully described my invention, that which I claim as novel and desire to protect by Letters Patent of the United States is:

1. In a machine for testing an armature having a two-circuit commuted winding located in slots therein, brushes and a commutator having a number of segments fewer than an integral multiple of the number of armature winding slots, the combination of means for producing a constant alternating current magnetic field, means for rotatably supporting the armature in a plurality of test positions, means for supporting current collecting brushes in operative relation with the commutator, means for indexing said armature with respect to said brushes to predetermined successive test positions corresponding to the armature slots, a voltage indicator connected to said brushes, and means responsive to said indexing means for automatically shifting said brushes relative to the commutator a definite number of degrees simultaneously with the indexing movement.

2. In a machine for testing an armature having a two-circuit commuted winding located in slots therein, brushes and a commutator having a number of segments fewer than an integral multiple of the number of armature winding slots, a stator for producing a constant alternating current magnetic field, means for rotatably supporting the armature and its associated commutator in successive test positions relative to said field corresponding to the armature slots, means for indexing said armature to said successive test positions and with respect to said commutator, means for arresting said rotation in said test positions, an indicator device responsive to voltage variations in the winding, and means responsive to said indexing means for automatically moving said brushes circumferentially relative to their associated commutator a predetermined number of degrees simultaneously with the indexing of said armature.

3. In a machine for testing an armature having a two-circuit commuted winding located in slots therein, brushes and a commutator having a number of segments fewer than an integral multiple of the number of armature winding slots, a stator for producing a constant alternating current magnetic field, means for rotatably supporting the armature and its associated brushes in operative relation therewith in test positions corresponding to the armature slots, means for indexing said armature to said test positions, a voltage indicator for indicating voltage variations in said windings, cam means associated with said armature, and means actuated by said cam for moving said brushes circumferentially relative to said armature while the latter is indexed from one test position to a succeeding test position.

4. In a machine for testing an armature having a two-circuit commuted winding located in slots therein, a shaft, associated brushes and a commutator having a number of segments fewer than an integral multiple of the number of armature winding slots, a stator for producing a constant alternating current magnetic field, means for rotatably supporting the armature in operative relation therewith, means for indexing said armature to test positions in said field corresponding to the armature slots, a voltage indicator for voltage variations in said windings, means applied to said armature shaft for automatically shifting said brushes with respect to said armature while the latter is indexed to the aforementioned test position in the magnetic field, and adjusting means for correcting the final position of said brushes on the commutator at said test positions in case of an irregularity in a particular commutator.

5. In apparatus for testing for faults in a dynamo electric machine armature having two-circuit commuted windings and associated brushes, a stator and a circuit including a generator for producing a constant alternating current magnetic field in said stator, an ammeter in said circuit, a test circuit comprising the aforementioned brushes, a selected winding and associated commutator segments, a voltage indicator and a potentiometer, means for rotatably supporting the armature in relation to said field in a plurality of test positions, means for indexing said armature to said test positions with respect to said field corresponding to the armature slots to form said circuit in each test position, and means responsive to the indexing movement for shifting said brushes relative to said armature during each indexing movement.

6. In apparatus for testing for faults in a dynamo electric machine armature having a shaft, two-circuit commuted windings, slots and associated brushes, a stator and a circuit therefor including a generator for producing a constant alternating current magnetic field, means for supporting and rotating said armature to predetermined test positions with respect to said field corresponding to the armature slots, said means including indexing means comprising an element in fixed position relative to the stator and having a slot and a circular groove communicating therewith and an element associated with the armature shaft and having two locating fingers, one of which operates to engage said slot and said groove whereas the other engages an armature slot, a test circuit comprising said brushes, a selected winding and its associated commutator segments, a voltage indicator, a potentiometer, and means for shifting said brushes relative to said armature during indexing from one test position to the succeeding test position.

7. In an apparatus for testing for faults in a dynamo electric machine armature having a commutator, associated brushes and a two-circuit commuted winding in which the displacement between corresponding coil sides of series connected coils is not uniform, stator means for producing an alternating magnetic field in inductive relation with said armature, means for rotatably supporting said armature with respect to said stator field in a plurality of test positions, means for indexing said armature to said test positions by a number of degrees equal to that of one armature slot pitch and for placing said armature in said test positions, means responsive to indexing movement for shifting said brushes with respect to said armature during rotation thereof to each of said test positions, a test circuit comprised of said brushes, a selected winding and its associated commutator segments, a cathode ray oscilloscope, and a potentiometer for indicating the voltage induced in each winding as it is brought into test position.

8. A test apparatus comprising means for supporting an armature having coils connected to a segmental commutator and a dead coil in the winding comprising a stator having test windings therein, means for exciting said windings to create a test field, means for indexing said armature one slot pitch at a time, a plurality of brushes engageable with selected commutator segments, a holder to support said brushes, a cam associated with said index means, means connected between said holder and said cam responsive to said indexing means for rotating said holder relative to said commutator as said armature is indexed to thereby compensate the effect of said dead coil, means for forming a test circuit including said brushes, said windings and the armature coil under test so arranged that the impressed voltage on said windings and the induced voltage in the armature coil under test will be in opposition to each other, and an oscilloscope to indicate the voltage condition existing in said circuit.

9. A test apparatus comprising means for rotatably supporting a slotted armature having a plurality of coils and a segmental commutator, means for indexing said armature one slot pitch at a time, a plurality of brushes mounted in a holder adapted to engage the armature commutator, means responsive to the indexing movement for moving said brush holder relative to the commutator, a winding for producing a test field operatively associated with said armature, means for forming a test circuit including said brushes, the selected coil under test and said winding, and means connected in said circuit for indicating voltage conditions in said circuit.

10. A test apparatus comprising means for supporting an armature having a plurality of coils connected to a segmental commutator having a dead coil therein and one less commutator segment than armature coils, means for indexing said armature from one test position to another, a holder for a plurality of test brushes operatively associated with said armature, a stator exciting winding for the armature under test, means responsive to said indexing means for moving said holder relative to the armature as it is indexed, means for forming a test circuit including said stator winding, the armature coil under test and said brushes arranged such that the voltage impressed on said coil is opposed by the voltage induced in the armature coil under test, and means in said circuit to indicate voltage conditions in said circuit.

11. A test apparatus comprising means for supporting an armature in a plurality of test positions and having a plurality of coils and a segmental commutator, said armature having at least one dead coil therein, means for indexing said armature from one test position to the other, an exciting winding for said armature under test, a plurality of test brushes for engagement with said commutator, a holder for said brushes disposed about said armature, means responsive to indexing movements for compensating the effect of said dead coil by bringing the armature coils under test into a similar phase relationship with said exciting winding, means for forming a test circuit including said exciting winding, the armature coil under test and said brushes so that the voltage impressed on said exciting winding and the voltage induced in said armature coil oppose each other, and means in said circuit for indicating balanced or unbalanced conditions in said circuit in each test position.

12. A test apparatus comprising means for supporting an armature in a plurality of test positions and having coils thereon connected to a segmental commutator and in which there is one less commutator segment than there are armature coils so that at least one of said coils is dormant, means for indexing said armature from one test position to another, means for maintaining said armature in any one test position, an exciting winding for said armature under test, means responsive to indexing movements for bringing selected coils on said armature into proper phase relationship with said exciting winding in order to compensate the effect of said dormant coil, means for connecting said winding and said armature coil under test in each test position so the voltages impressed and induced therein, respectively, are in opposition to each other, and means for indicating balanced or unbalanced voltage conditions in said last mentioned means.

13. A test apparatus comprising a coil wound commutated armature having a dead coil therein and one less commutator segment than there are armature coils, means for supporting an armature in a plurality of test positions, means for indexing the armature from one test position to another, a stator field winding for said armature, a brush holder having brushes thereon engageable with the commutator, means responsive to indexing movements for moving said brush holder relative to the commutator in order that it will be connected to the armature coil having the proper phase relation with said stator field winding, means responsive to the indexing of said armature for maintaining a predetermined relation between said armature and said winding, means for forming a test circuit including switch means to bring a selected armature coil in each test position into said test circuit so that the impressed voltage on said winding will be in opposition to the voltage induced in said coil under test, and means in said circuit to indicate the nature of any voltage unbalancing in said circuit under test.

14. An armature testing machine comprising means for reciprocably supporting a commuted armature, means for rotatably supporting an armature in a plurality of test positions, means for applying an indexing movement to said armature to index it from one test position to the next, a holder for test brushes, the armature being reciprocated toward and away from said test brush holder to bring the commutator into engagement with the brushes in said holder, means for relatively rotating said holder and said armature in response to the indexing movement, and means for adjusting said holder relative to the commutator so that the brushes may be centered with respect to the commutator segments.

15. A test apparatus comprising means for supporting a commuted slotted armature having a plurality of coils per slot, the armature having one dead coil, means for rotatably supporting the armature in a plurality of test positions, means for indexing said armature from one test position to the next, a stator winding and field operatively associated with said armature, a plurality of test brushes engageable with the commutator, a holder for said test brushes, means for moving said holder in relation to the commutator in response to the indexing movement, and means for forming a circuit to successively oppose the induced voltages of each individual coil against the voltage impressed across said stator winding in a manner to enable the differences between them to be measured, and an oscilloscope mechanism in said circuit to indicate the cause of said difference.

16. In a structure as defined in claim 15 in which means are provided for circumferentially adjusting said holder with respect to the commutator.

17. The method of testing for faults in the coils of a dynamo electric machine armature having commuted coils lying in slots on its periphery in which the displacement between corresponding coil sides of adjacent coils is not uniform and is equipped with a commutator, which consists in subjecting said armature to a constant alternating magnetic field, placing one coil of said armature and its associated commutator segments in a circuit comprised of brushes in contact with said commutator segments to which is connected a voltage indicator, placing each coil consisting of two coil sides each lying in spaced apart slots in the armature successively in such a position that the coil under test embraces a fixed quantity of the magnetic lines of force of said magnetic field, shifting said brushes to contact commutator segments connected to the coil under observation as said coil is rotated into position, indicating the voltage induced between the commutator segments connected to the ends of the said positioned coil, and comparing the voltage induced in each coil with that of another coil when in position for test.

18. An armature testing machine comprising a stator, means for supporting an armature for movement relative to said stator, said armature having a commutator with a lesser number of segments than there are armature coils, means for indexing said armature from one test position to another, a brush holder having a plurality of brushes therein engageable with said commutator, means for forming a circuit to successively oppose the induced voltages of each individual coil against the voltage impressed across said stator winding in a manner to enable the differences between them to be measured, means in said circuit to indicate the cause of said differences of potential, and means for shifting the brushes relative to said commutator so as to keep them in engagement with commutator segments having a uniform potential therebetween as said armature is indexed.

19. An armature testing machine comprising a stator, a source of alternating current power to excite said stator, a holder having a plurality of test brushes therein, means for supporting and reciprocating a commuted armature in said stator, said armature having one less commutator segment than there are armature coils, means for rotatively indexing said armature from one test position to the next, means for maintaining said armature in a predetermined position relative to said indexing means, means for shifting said brush holder relative to said commutator in order to maintain the brushes in said holder in engagement with commutator segments having a constant potential induced therebetween by said stator, indicating means connected to said brushes and to said stator for measuring the difference in voltages therebetween and the causes thereof, and means for adjusting said holder so as to maintain said brushes properly positioned relative to the segments having constant potential therebetween with which they are in engagement.

HANS WEICHSEL.

REFERENCES CITED

The following references are of record in the file of this patent:

UNITED STATES PATENTS

| Number | Name | Date |
|---|---|---|
| 1,240,585 | Lee | Sept. 18, 1917 |
| 1,427,407 | Mills | Aug. 29, 1922 |
| 1,432,003 | West | Oct. 17, 1922 |
| 1,479,284 | Cullin | Jan. 1, 1924 |
| 1,521,605 | Diehl | Jan. 6, 1925 |
| 1,906,030 | Whelchel | Apr. 25, 1933 |
| 2,427,672 | Haydock | Sept. 23, 1947 |